INVENTOR
Burton H. Locke

United States Patent Office 2,847,863
Patented Aug. 19, 1958

2,847,863
VARIABLE SPEED ATTACHMENTS FOR MOTORS

Burton H. Locke, Framingham, Mass.

Application December 7, 1956, Serial No. 626,911

1 Claim. (Cl. 74—230.17)

This invention relates to improvements in variable speed drives suitable to be applied to an existing constant speed motor to obtain infinite variable speed from the motor to drive other machines or equipment at variable speeds. The invention is in the form of variable speed apparatus attached directly to a motor frame by clamping means.

The main object of the invention is to provide a simple inexpensive variable speed device by reason of mounting variable speed equipment directly onto an existing motor and thereby form a simple compact unit that eliminates provision for additional base structure to mount the combined equipment thereon such as is required in conventional variable speed devices now on the market.

Another object is to provide a clamping means that will not require any connection into the motor frame for attaching the variable speed apparatus thereto and thus eliminate any drilling or tapping requirement of the motor frame.

Another object is to provide a clamping means that will adjust to clamp the apparatus to various sizes of motors within medium limits and thereby eliminate the requirement of different sizes of clamps for relative small changes in motor sizes.

Another object is to provise a clamp that will rigidly clamp the motor and a variable speed shaft structure together simultaneously in one clamping operation and thus afford simple operative clamping means.

Another object is to provide a simple operative means to vary the speed of the variable speed shaft.

A still further object is to provide a very simple compact structure that will be relatively inexpensive to produce and one that will, due to its few simple parts, require only a minimum of maintenance.

Figures 1, 2:
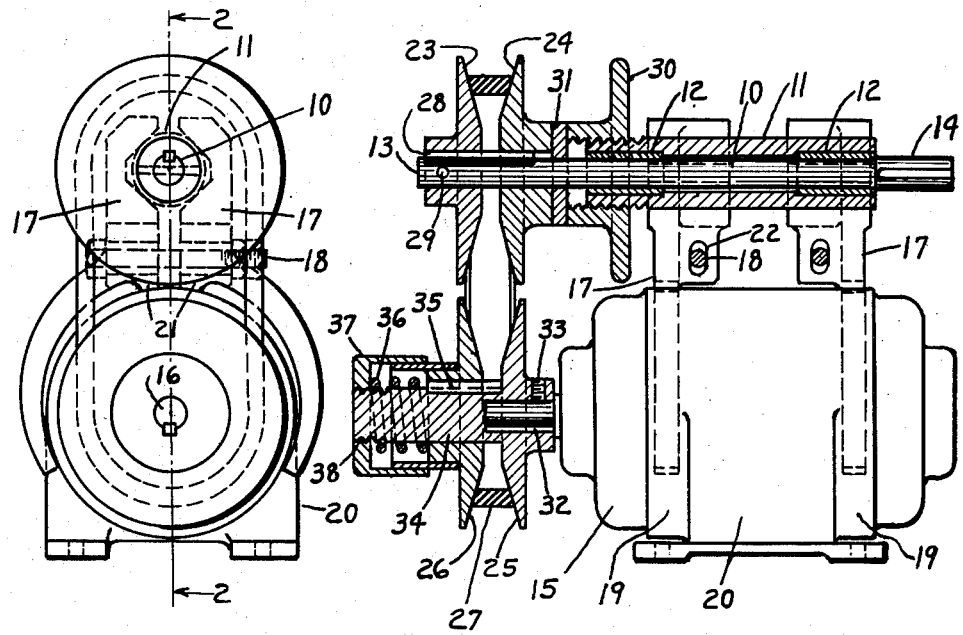
Figure 1 is a front elevation of my variable speed device as attached to a motor.
Figure 2 is a section taken on line 2—2, of Figure 1, with the motor shown in full.

My improved variable speed attachment for motors comprises a countershaft 10 rotatively mounted in an annular housing structure 11 by means of, in this instance, sleeve bearings 12. Anti-friction bearings could be used in place of the sleeve bearings 12 if desired. One end 13 of the countershaft 10 extends outside of the housing 11 to receive variable speed driving mechanism and the other end 14 thereof extends outside of said housing to receive driving gear, such as a pulley; sprocket or gear, etc, not shown, to drive a remote machine or mechanism.

In the construction shown in Figures 1 and 2, the housing 11 is rigidly mounted onto a motor 15 so that shaft 10 is held in spaced relationship to the motor shaft 16 by means of two pairs of opposing E-shaped clamps 17 which partially encircle the annular housing 11 and the motor 15 and are urged together simultaneously into clamping contact therewith by means of bolts 18 that extend through each pair of opposing clamps, respectively, intermediate the said housing and motor. Thus there is no bolting requirement directly into the motor or into the housing. Thus no machine work is required at the time of application. This is an important objective of the invention.

The pairs of clamps 17 are applied to the motor 15 at the circular portions 19 thereof that are normally at each side of the flat central portion 20. However, if desired a single pair of clamps 40 could be adapted to contact the flatted central portion 20 in the manner shown in Figures 3 and 4 without departing from the invention. In either case there are pad portions 21 provided on the clamps to contact the motor near the top thereof and thereby retain the struction in position vertically.

It is obvious that the clamps will adjust to clamp to motors of somewhat varied diameters, which is an objective feature of the invention, due to the motor and the housing being annular in cross-section and the clamps being free to move toward and away from each other and to swing relative to each other due to the bolts 18 extending through elongated apertures 22 provided in each clamp 17 which would permit the clamps to swing relative to each other.

Figures 3, 4:
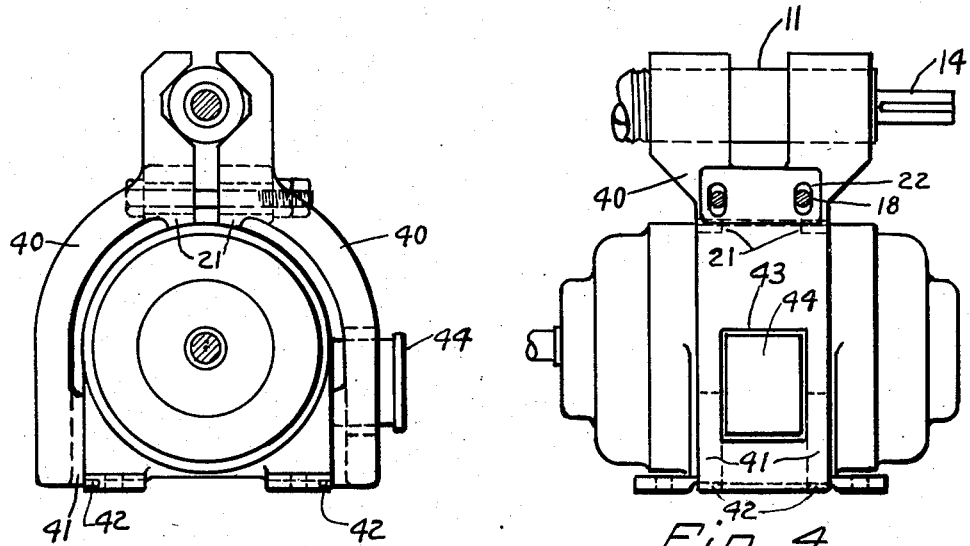
Figure 3 is an elevation to the same scale showing a modified clamping location on a motor.
Figure 4 is a side elevation showing the clamp set forth in Figure 3.

As shown in Figures 3 and 4, the clamps 40 generally are extended down the straight sides of the motor and pads 41, located at each side of the clamps, contact the flat surface of the motor and lip portions 42 are provided at the lower ends of the clamps to extend in under the bottom of the motor. The lip portions 42 serve to assure that the clamps will not rotate on the motor frame by the pull of the V-belt, or the gear that may drive to other mechanism, as to be explained hereinafter. When necessary, an aperture 43 is provided in one of the clamps 40 to clear a junction box 44 which is conventional structure on one side of many types of motors.

A pair of opposed cones 23 and 24 are provided on the extended end 13 of the counter shaft 10 and a similar pair of opposed cones 25 and 26 are provided on the motor shaft 16 and a V-belt 27 is provided to operate over the said cones.

The cone 23 is secured to shaft 10 by means of a key 28 and a pin 29. Cone 24 is slidably mounted on the shaft 10 and held to rotate therewith by the key 28. In this instance, a handwheel 30 having threaded engagement with housing 11 is provided to urge cone 24 toward cone 23 to cause the V-belt 27 to travel outwardly to assume a longer path on the cones and thus effect a variation in the speed of the shaft 10. A thrust bearing 31, which could be a plain bearing as shown or could be of a conventional anti-friction type bearing, is provided intermediate the handwheel 30 and the cone 24. Other means could be provided in place of that shown to cause cone 24 to slide on shaft 10, such as clutch shifting levers, etc.

Cone 25 is secured to motor shaft 16 by means of a key 32 and a set screw 33. Cone 25 has an outwardly extended hub portion 34 on which cone 26 is slidably mounted and held to rotate therewith by means of a key 35. A compression spring 36 is provided to abut cone 26 and an adjusting nut 37 which has threaded engagement 38 with hub portion 34 of cone 25. The compression effect of spring 36 can be regulated by the adjusting nut 37.

Spring 36 resiliently urges cone 26 toward cone 25 and thereby automatically retains a suitable operating tension on the V-belt 27 at all adjustments of the cones 23 and 24. For example, when the cones 23 and 24 are urged toward each other the V-belt travels outwardly on said cones and inwardly on cones 25 and 26 and the spring 36 is compressed. Conversely, when the cones 23 and 24 are permitted to move apart the V-belt can move inwardly to a smaller path on said cones and outwardly to a larger path on cones 25 and 26 by spring 36 urging the cones 25 and 26 toward each other.

Therefore, infinite variable speed of shaft 10 within the capacity of the mechanism can be obtained and such speed can be transmitted to a machine or other equipment through gear that can be mounted on the extended end 14 of the shaft 10.

I do not wish to be confined to the exact details set forth as the same are susceptible of modification within the spirit and scope of the invention.

For instance, the spring actuated cones could be located on the countershaft and the positive actuated cones on the motor shaft, if desired, without changing the function of the drive.

I claim:

A variable speed drive device for attachment to a motor comprising three parts in combination, a rotable housed countershaft, means to pressure clamp the housing of the countershaft onto a motor and infinite variable speed driving equipment for use intermediate the motor and the countershaft, the countershaft comprising a shaft rotatably mounted in a housing with both ends protruding therefrom, the clamping means comprising at least one pair of opposed clamps disposed to engage the motor and the countershaft housing and rigidly clamp the same together simultaneously by pressure disposed to be applied intermediate the motor and countershaft housing to urge the clamps toward each other and thereby rigidly position the countershaft in spaced relationship to the motor shaft, the variable speed driving equipment comprising a pair of opposed cones for disposition on one of the shafts in a manner to be resiliently urged toward each other and a pair of opposed cones for disposition on the other shaft in a manner to be positively adjusted toward each other and a V-belt to operate over the pairs of cones and means on the device that can be employed to positively adjust the respective pair of cones to adjust the relative speed of the shafts.

References Cited in the file of this patent
UNITED STATES PATENTS

| | | |
|---|---|---|
| 1,529,231 | Arnold | Mar. 10, 1925 |
| 2,041,332 | Golden | May 19, 1936 |
| 2,235,333 | Reeves | Mar. 18, 1941 |
| 2,326,508 | Whitcomb | Aug. 10, 1943 |
| 2,552,234 | Thibodeau | May 8, 1951 |